(12) United States Patent
Chen

(10) Patent No.: US 8,090,554 B2
(45) Date of Patent: Jan. 3, 2012

(54) TORQUE TESTING SYSTEM AND METHOD

(75) Inventor: Hsiang-Hung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 272 days.

(21) Appl. No.: 12/632,939

(22) Filed: Dec. 8, 2009

(65) Prior Publication Data

US 2010/0324837 A1 Dec. 23, 2010

(30) Foreign Application Priority Data

Jun. 18, 2009 (CN) .......................... 2009 1 0303417

(51) Int. Cl.
*G01L 3/00* (2006.01)
(52) U.S. Cl. ........................................................ 702/166
(58) Field of Classification Search .................... 702/166
See application file for complete search history.

(56) References Cited

U.S. PATENT DOCUMENTS 4,592,256 A * 6/1986 Bosque ........................ 81/57.29
* cited by examiner

*Primary Examiner* — Tung S Lau
(74) *Attorney, Agent, or Firm* — Altis Law Group, Inc.

(57) ABSTRACT

An exemplary torque testing system includes a first screwdriver, a second screwdriver, a height measuring device, and a processor. The first screwdriver turns the first structure into the second structure using a maximum torque until the depth of the first structure turned into the second structure equals a predetermined minimum depth or the first structure is unable to be turned by the maximum torque. The second screwdriver turns the first structure into the second structure using a minimum torque until the first structure is unable to be turned by the minimum torque. The height measuring device measures the height of the combined first structure and second structure. The processor determines that the engagement between the first structure and the second structure is satisfactory, if the height of the combined first structure and second structure is in a range from a minimum height to a maximum height thereof.

20 Claims, 3 Drawing Sheets

TORQUE TESTING SYSTEM AND METHOD

BACKGROUND

1. Technical Field

The present disclosure relates to torque testing systems and methods and, particularly, to a torque testing system and a torque testing method for testing whether the threaded engagement between two components, such as a lens barrel and a barrel holder, satisfies a user's requirement.

2. Description of Related Art

A lens module generally includes a barrel holder and a lens barrel threadedly engaged with the barrel holder. During assembling of the lens module, the lens barrel needs to be turned into the barrel holder. To turn the lens barrel, a torque must be applied to the lens barrel. If the friction between the lens barrel and the barrel holder during the turning process is too large, the turning process may cause either or both of the lens barrel and the barrel holder to deform, or the lens barrel may be unable turn to a desired position. On the other hand, if the friction between the lens barrel and the barrel holder during the turning process is too small, the lens barrel may be turned too far into the barrel holder, or it may be problematic for the lens barrel to be positioned firmly.

What is needed, therefore, is a torque testing system and a torque testing method to overcome or at least mitigate the above-described problems.

BRIEF DESCRIPTION OF THE DRAWINGS

Many aspects of the present torque testing system and torque testing method can be better understood with reference to the accompanying drawings. The components in the drawings are not necessarily drawn to scale, the emphasis instead being placed upon clearly illustrating the principles of the present torque testing system and torque testing method. In the drawings, all the views are schematic.

DETAILED DESCRIPTION

Embodiments of the present disclosure will now be described in detail below, with reference to the accompanying drawings.

Figure 1:
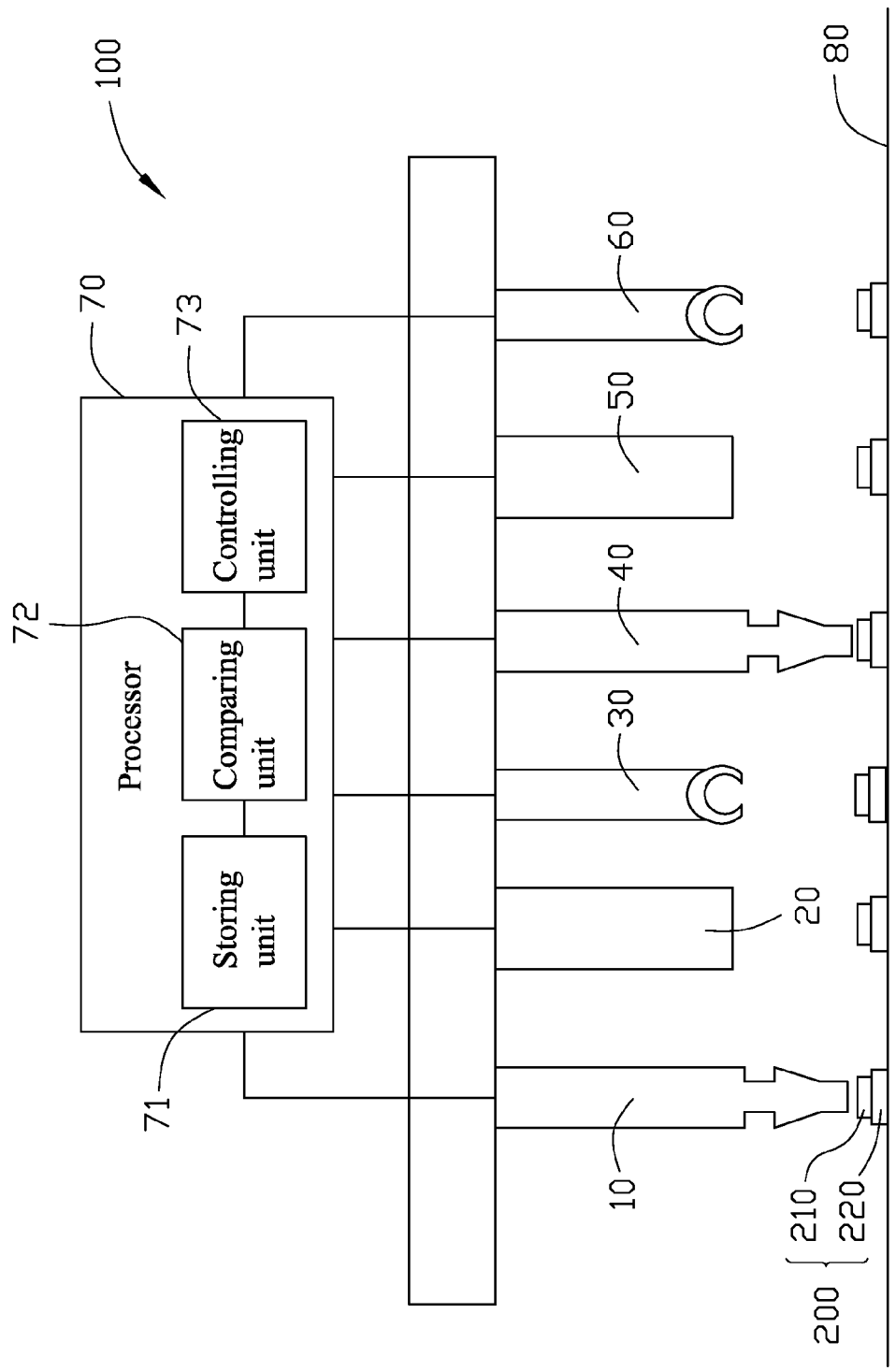
FIG. 1 is a schematic view of a torque testing system according to a first exemplary embodiment.

Referring to FIG. 1, a torque testing system 100, according to a first exemplary embodiment, is shown. The torque testing system 100 is used for testing whether a first structure 210 and a second structure 220 of a device 200 are satisfactorily engaged together, that is, whether an engagement between the first structure 210 and the second structure 220 is neither too tight nor too loose. The first structure 210 is threadedly engaged with the second structure 220. In the present embodiment, the device 200 is a lens module, the first structure 210 is a lens barrel, and the second structure 220 is a barrel holder. A desired depth of the first structure 210 turned into the second structure 220 is in a range from a predetermined minimum depth to a predetermined maximum depth, and a desired friction between the first structure 210 and the second structure 220 is in a range from a predetermined minimum friction to a predetermined maximum friction when the first structure 210 is turned into the second structure 220 the desired depth.

The torque testing system 100 includes a first screwdriver 10, a first height measuring device 20, a first clamp 30, a second screwdriver 40, a second height measuring device 50, a second clamp 60, a processor 70, and a conveyor belt 80. The first screwdriver 10, the first height measuring device 20, the first clamp 30, the second screwdriver 40, the second height measuring device 50, and the second clamp 60 are arranged sequentially along the moving direction of the conveyor belt 80. The first screwdriver 10, the first height measuring device 20, the first clamp 30, the second screwdriver 40, the second height measuring device 50, and the second clamp 60 are connected to the processor 70.

The first screwdriver 10 is configured for turning the first structure 210 into the second structure 220 using a maximum torque equal to the predetermined maximum friction. The first screwdriver 10 turns the first structure 210 until the depth of the first structure 210 turned into the second structure 220 is equal to the predetermined minimum depth or the first structure 210 is unable to be turned any more by the maximum torque. If the engagement between the first structure 210 and the second structure 220 is too tight, the friction between the first structure 210 and the second structure 220 will be larger than the maximum torque before the depth of the first structure 210 turned into the second structure 220 reaches the desired predetermined minimum depth.

The first height measuring device 20 is configured for measuring the height of the combined first structure 210 and second structure 220 after the operation of the first screwdriver 10 is completed. If the engagement between the first structure 210 and the second structure 220 is too tight, the height of the combined first structure 210 and second structure 220 will be too large.

The first clamp 30 is used for removing the combined first structure 210 and second structure 220 from the conveyor belt 80, if the engagement therebetween is too tight.

The second screwdriver 40 is configured for turning the first structure 210 into the second structure 220 using a minimum torque equal to the predetermined minimum friction until the first structure 210 is unable to be turned any more by the minimum torque. If the engagement between the first structure 210 and the second structure 220 is too loose, the friction between the first structure 210 and the second structure 220 will be smaller than the minimum torque even after the depth of the first structure 210 turned into the second structure 220 exceeds the desired predetermined maximum depth.

The second height measuring device 50 is configured for measuring the height of the combined first structure 210 and second structure 220 after the operation of the second screwdriver 40 is completed. If the engagement between the first structure 210 and the second structure 220 is too loose, the height of the combined first structure 210 and second structure 220 will be too small.

The second clamp 60 is used for removing the combined first structure 210 and second structure 220 from the conveyor belt 80, if the engagement therebetween is too loose.

The processor 70 includes a storing unit 71, a comparing unit 72, and a controlling unit 73.

The storing unit 71 stores the predetermined minimum friction, the predetermined maximum friction, the predetermined minimum depth, the predetermined maximum depth, a maximum height of the combined first structure 210 and second structure 220, and a minimum height of the combined first structure 210 and second structure 220. The maximum height of the combined first structure 210 and second structure 220 is the height of the combined first structure 210 and second structure 220 when the depth of the first structure 210 turned into the second structure 220 is equal to the predetermined minimum depth. The minimum height of the combined first structure 210 and second structure 220 is the height of the combined first structure 210 and second structure 220 when the depth of the first structure 210 turned into the second structure 220 is equal to the predetermined maximum depth.

The comparing unit 72 is configured for comparing the height of the combined first structure 210 and second structure 220 measured by the first height measuring device 20 with the maximum height of the combined first structure 210 and second structure 220, and determining that the engagement between the first structure 210 and the second structure 220 is too tight if the height of the combined first structure 210 and second structure 220 measured by the first height measuring device 20 is larger than the maximum height of the combined first structure 210 and second structure 220. The comparing unit 72 is further configured for comparing the height of the combined first structure 210 and second structure 220 measured by the second height measuring device 50 with the minimum height of the combined first structure 210 and second structure 220, and determining that the engagement between the first structure 210 and the second structure 220 is too loose if the height of the combined first structure 210 and second structure 220 measured by the second height measuring device 50 is smaller than the minimum height of the combined first structure 210 and second structure 220.

The controlling unit 73 is configured for controlling the operation of the first screwdriver 10, the first height measuring device 20, the first clamp 30, the second screwdriver 40, the second height measuring device 50, and the second clamp 60.

The conveyor belt 80 is used for transmitting the combined first structure 210 and second structure 220.

Figure 2:
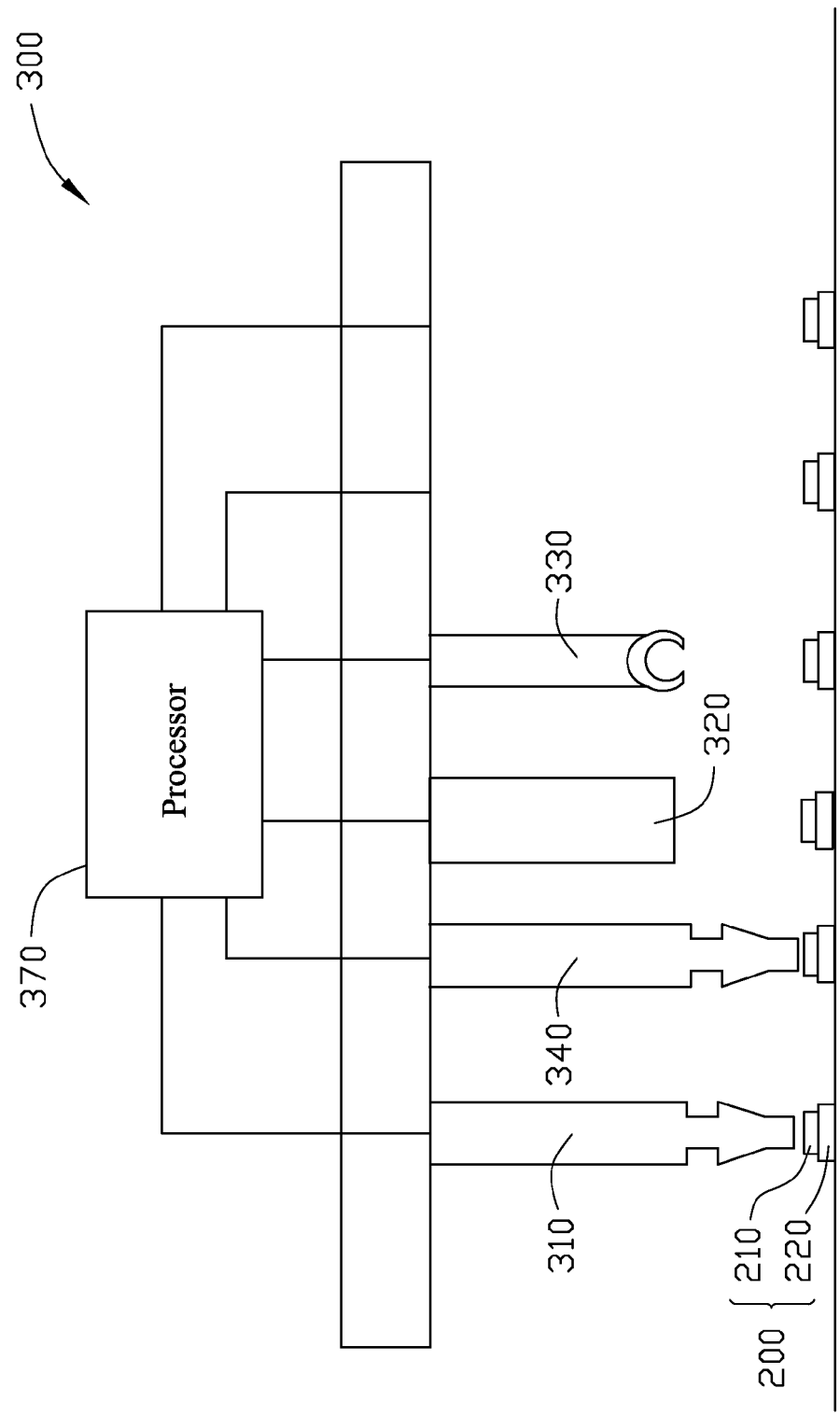
FIG. 2 is a schematic view of a torque testing system according to a second exemplary embodiment.

Referring to the FIG. 2, a torque testing system 300, according to a second exemplary embodiment, is shown. The torque testing system 300 includes a first screwdriver 310, a second screwdriver 340, a height measuring device 320, and a clamp 330 arranged along a single direction sequentially. The first screwdriver 310 is the same as the first screwdriver 10 of the first embodiment, and the second screwdriver 340 is the same as the second screwdriver 40 of the first embodiment. The height measuring device 320 is configured for measuring the height of the combined first structure 210 and second structure 220. A processor 370 is used for determining whether the height of the combined first structure 210 and second structure 220 is in a range from a minimum height to a maximum height of the combined first structure 210 and second structure 220. The clamp 330 is configured for removing the first structure 210 from the second structure 220, if the height of the combined first structure 210 and second structure 220 is not in the range from the minimum height to the maximum height of the combined first structure 210 and second structure 220.

Figure 3:
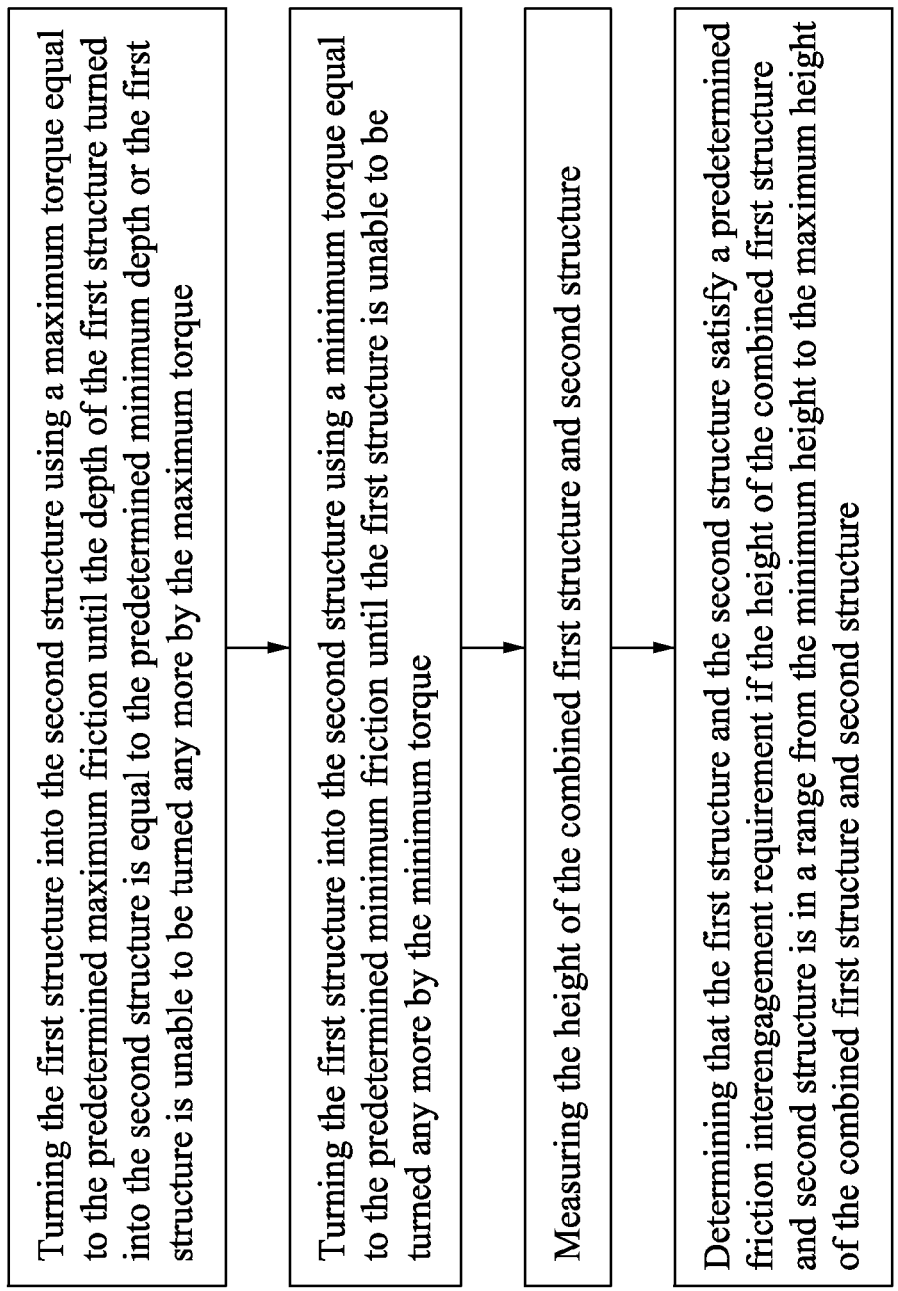
FIG. 3 is a flow chart of an exemplary torque testing method of the torque testing system of FIG. 2.

Referring to the FIG. 3, a flow chart of an exemplary torque testing method is shown. The method includes the steps of: turning the first structure 210 into the second structure 220 using a maximum torque equal to the predetermined maximum friction until the depth of the first structure 210 turned into the second structure 220 is equal to the predetermined minimum depth or the first structure 210 is unable to be turned any more by the maximum torque; turning the first structure 210 into the second structure 220 using a minimum torque equal to the predetermined minimum friction until the first structure 210 is unable to be turned any more by the minimum torque; measuring the height of the combined first structure 210 and second structure 220; and determining that the first structure 210 and the second structure 220 satisfy a predetermined friction interengagement requirement if the height of the combined first structure 210 and second structure 220 is in a range from the minimum height to the maximum height of the combined first structure 210 and second structure 220.

While certain embodiments have been described and exemplified above, various other embodiments will be apparent to those skilled in the art from the foregoing disclosure. The invention is not limited to the particular embodiments described and exemplified, and the embodiments are capable of considerable variation and modification without departure from the scope and spirit of the appended claims.

What is claimed is:

1. A torque testing system for testing whether a first structure and a second structure are capable of satisfactory threaded engagement together, a desired depth of the first structure turned into the second structure being in a range from a predetermined minimum depth to a predetermined maximum depth, and a desired friction between the first structure and the second structure being in a range from a predetermined minimum friction to a predetermined maximum friction when the first structure is turned into the second structure the desired depth, the torque testing system comprising:
   a first screwdriver for turning the first structure into the second structure using a maximum torque equal to the predetermined maximum friction until the depth of the first structure turned into the second structure is equal to the predetermined minimum depth or the first structure is unable to be turned any more by the maximum torque;
   a second screwdriver for turning the first structure into the second structure using a minimum torque equal to the predetermined minimum friction until the first structure is unable to be turned any more by the minimum torque;
   a height measuring device for measuring the height of the combined first structure and second structure; and
   a processor for comparing the measured height of the combined first structure and second structure with a predetermined minimum height and a predetermined maximum height of the combined first structure and second structure, and determining that the engagement between the first structure and the second structure satisfies a threaded engagement requirement if the measured height of the combined first structure and second structure is in a range from the minimum height to the maximum height of the combined first structure and second structure.

2. The torque testing system of claim 1, further comprising a conveyor belt, wherein the first screwdriver, the second screwdriver, and the height measuring device are arranged sequentially along the moving direction of the conveyor belt.

3. The torque testing system of claim 2, further comprising a clamp for selectably removing the combined first structure and second structure from the conveyor belt.

4. The torque testing system of claim 1, wherein the first structure is a lens barrel, and the second structure is a barrel holder.

5. The torque testing system of claim 1, wherein the predetermined minimum friction, the predetermined maximum friction, the predetermined minimum depth, the predetermined maximum depth, the maximum height of the combined first structure and second structure, and the minimum height of the combined first structure and second structure are stored in the processor.

6. The torque testing system of claim 1, wherein the maximum height of the combined first structure and second structure is the height of the combined first structure and second structure when the depth of the first structure turned into the second structure is equal to the predetermined minimum depth.

7. The torque testing system of claim 1, wherein the minimum height of the combined first structure and second structure is the height of the combined first structure and second structure when the depth of the first structure turned into the second structure is equal to the predetermined maximum depth.

8. A torque testing system for testing whether a first structure and a second structure are capable of satisfactory threaded interengagement, a desired depth of the first structure turned into the second structure being in a range from a predetermined minimum depth to a predetermined maximum depth, and a desired friction between the first structure and the second structure being in a range from a predetermined minimum friction to a predetermined maximum friction when the first structure is turned into the second structure the desired depth, the torque testing system comprising:
- a first screwdriver for turning the first structure into the second structure using a maximum torque equal to the predetermined maximum friction until the depth of the first structure turned into the second structure is equal to a predetermined minimum depth or the first structure is unable to be turned any more by the maximum torque;
- a first height measuring device for measuring the height of the combined first structure and second structure after the operation of the first screwdriver is completed;
- a second screwdriver for turning the first structure into the second structure using a minimum torque equal to the predetermined minimum friction until the first structure is unable to be turned any more by the minimum torque;
- a second height measuring device for measuring the height of the combined first structure and second structure after the operation of the second screwdriver is completed; and
- a processor for comparing the height of the combined first structure and second structure as measured by the first height measuring device with a maximum height of the combined first structure and second structure, comparing the height of the combined first structure and second structure as measured by the second height measuring device with a minimum height of the combined first structure and second structure, and determining that the engagement between the first structure and the second structure satisfies a threaded interengagement requirement if the height as measured by the first height measuring device is equal to or smaller than the maximum height of the combined first structure and second structure and if the height as measured by the second height measuring device is equal to or larger than the minimum height of the combined first structure and second structure.

9. The torque testing system of claim 8, further comprising a conveyor belt, wherein the first screwdriver, the first height measuring device, the second screwdriver, and the second measuring device are arranged sequentially along the moving direction of the conveyor belt.

10. The torque testing system of claim 9, further comprising a first clamp arranged between the first height measuring device and the second screwdriver for selectably removing the combined first structure and second structure from the conveyor belt.

11. The torque testing system of claim 9, further comprising a second clamp after the second height measuring device for selectably removing the combined first structure and second structure from the conveyor belt.

12. The torque testing system of claim 8, wherein the first structure is a lens barrel, and the second structure is a barrel holder.

13. The torque testing system of claim 8, wherein the predetermined minimum friction, the predetermined maximum friction, the predetermined minimum depth, the predetermined maximum depth, the maximum height of the combined first structure and second structure, and the minimum height of the combined first structure and second structure are stored in the processor.

14. The torque testing system of claim 8, wherein the maximum height of the combined first structure and second structure is the height of the combined first structure and second structure when the depth of the first structure turned into the second structure is equal to the predetermined minimum depth.

15. The torque testing system of claim 8, wherein the minimum height of the combined first structure and second structure is the height of the combined first structure and second structure when the depth of the first structure turned into the second structure is equal to the predetermined maximum depth.

16. A torque testing method for testing whether a first structure and a second structure are capable of satisfactory threaded engagement together, the torque testing method comprising:
- recording a depth of the first structure turned into the second structure as having a desired range from a predetermined minimum depth to a predetermined maximum depth, and a friction between the first structure and the second structure as having a desired range from a predetermined minimum friction to a predetermined maximum friction when the first structure is turned into the second structure the desired depth;
- turning the first structure into the second structure using a maximum torque equal to the predetermined maximum friction until the depth of the first structure turned into the second structure is equal to the predetermined minimum depth or the first structure is unable to be turned any more by the maximum torque;
- turning the first structure into the second structure using a minimum torque equal to the predetermined minimum friction until the first structure is unable to be turned any more by the minimum torque;
- measuring the height of the combined first structure and second structure;
- comparing the measured height of the combined first structure and second structure with a minimum height and a maximum height of the combined first structure and second structure; and
- determining by a processor that the first structure and the second structure satisfy a threaded engagement requirement when the measured height of the combined first structure and second structure is in a range from the minimum height to the maximum height of the combined first structure and second structure.

17. The method of claim 16, wherein the first structure is a lens barrel, and the second structure is a barrel holder.

18. The method of claim 16, wherein the maximum height of the combined first structure and second structure is the height of the combined first structure and second structure when the depth of the first structure turned into the second structure is equal to the predetermined minimum depth.

19. The method of claim 16, wherein the minimum height of the combined first structure and second structure is the height of the combined first structure and second structure when the depth of the first structure turned into the second structure is equal to the predetermined maximum depth.

20. The method of claim 16, further comprising removing the combined first structure and second structure when the height of the combined first structure and second structure is not in the range from the minimum height to the maximum height of the combined first structure and second structure.

* * * * *